SPHERICAL ABERRATION, SINUSOIDAL CONDITION

ASTIGMATISM

DISTORTION

CHROMATIC ABERRATION
OF MAGNIFICATION

3,532,414
CONTINUOUS MAGNIFICATION LENS SYSTEM
Takashi Higuchi, Yokohama-shi, and Soichi Nakamura,
  Tokyo, Japan, assignors to Nippon Kogaku K.K.,
  Tokyo, Japan, a corporation of Japan
    Filed Aug. 25, 1967, Ser. No. 663,380
  Claims priority, application Japan, Sept. 3, 1966,
              41/57,887
          Int. Cl. G02b *15/14*
U.S. Cl. 350—184                              2 Claims

ABSTRACT OF THE DISCLOSURE

The present invention relates to a zooming lens system for a projector and a camera in which zooming operation is done by moving back and forth a diverging lens group of the zooming system composed of converging-diverging-converging-converging lens groups, and the zooming ratio is 2.5 at maximum, and it is bright as much as the aperture ratio goes toward 1:1.2, and the angle of view can be widened as far as 25° at the minimum focal length.

---

Figure 1:
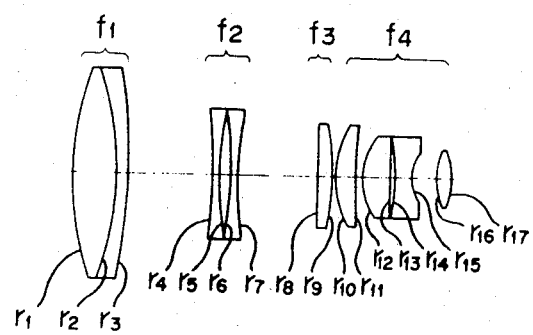
Figure 2:
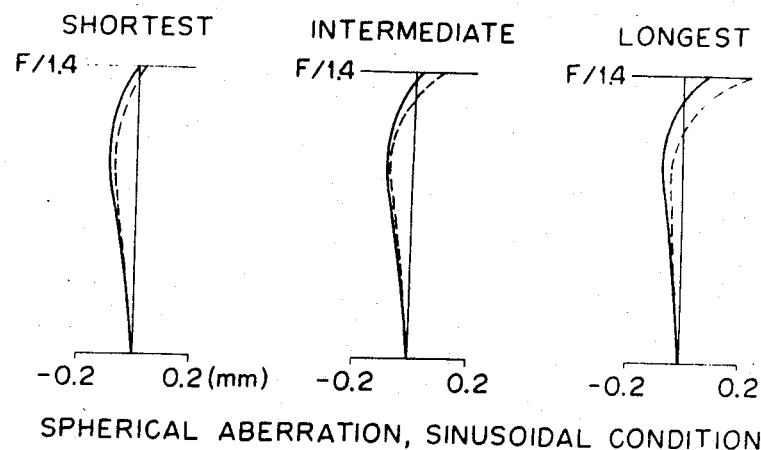
Figure 3:
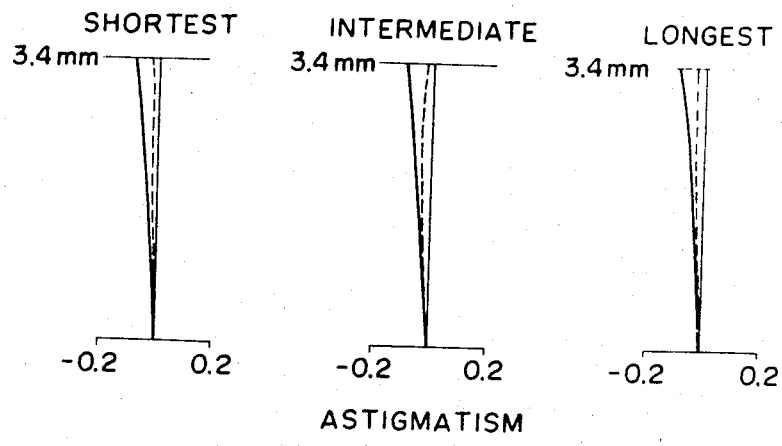
Figure 4:
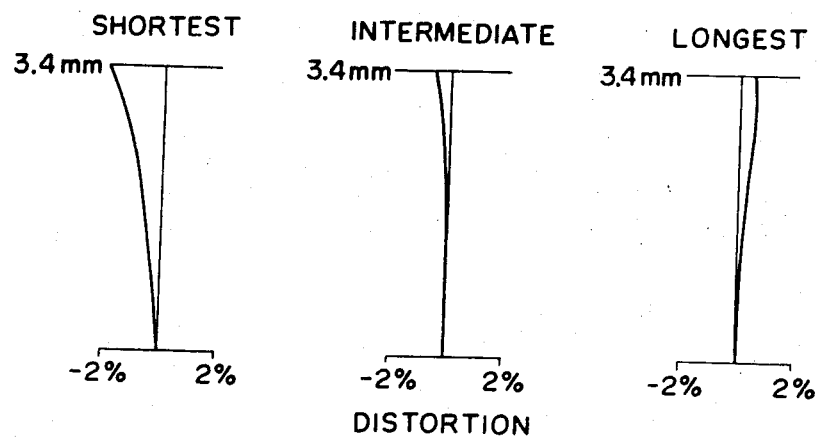
Figure 5:
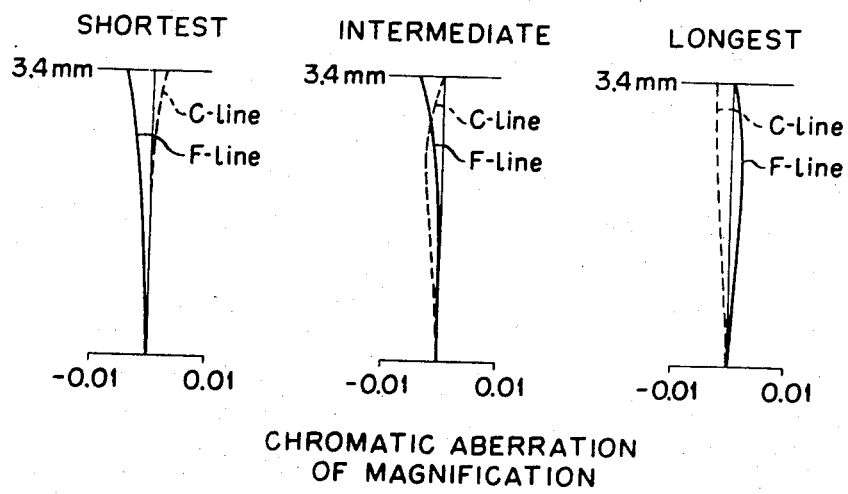

The present invention relates to a continuous magnification lens system applicable to projectors and photographic cameras.

According to the present invention, the zoom system consists of converging-diverging-converging-converging lens groups, of which the diverging group being moved back and forth to make zooming operation, and the obtainable maximum zoom ratio is 2.5, the aperture ratio is 1:1.2, and the angle of view at the shortest focal length is 25°.

The object of the present invention is to more effectively reduce chromatic aberration of magnification at any focal length when compared with the conventional zooming system, without increasing the number of glasses, and to excellently correct the distortion aberration although the zooming zone of this invention is closer to the wide angle side as a zooming system of this kind.

The zooming system of this invention is composed of four groups of lenses, i.e., the first converging lens group, the second diverging lens group, the third converging lens group, and the fourth converging lens group, and the zooming operation is done mainly by moving the second diverging lens group.

The first converging lens group is composed of a positive lens and a negative lens adhered to each other; the second diverging lens group is composed of two negative lenses; the third converging lens group is composed of one single positive lens; and the fourth lens group is a relay lens system, and as the principle it is composed of four lenses, i.e., positive-positive-negative-positive lenses. However, the negative lens of the relay lens system may be an achromatic adhered lens.

Generally speaking, the first group, the second group, and the third group of the lens system of this type are composed of one to two single lenses, and it is difficult to correct the chromatic aberration of magnification. Even if these single lenses should be replaced by the glass of more than Abbe's No. 60, the chromatic aberration of magnification in the peripheral portion of the image is greatly changed from minus to plus within the range from the point of shortest focal length to the point of the maximum focal length and this remarkably reduces the optical efficiency of the system. In this case, the relative range of deviation of the chromatic aberration of the magnification caused by the change of the form of the zooming system is very small. Therefore, according to conventional systems which are now used, the zooming system is enlarged more than the relay lens system, and the zooming ratio is lowered below two, and therefore the range of deviation of the chromatic aberration is equally divided at both ends of the zooming zone. Even though one group of lenses of the zooming system should be achromatic, the chromatic aberration of magnification cannot be greatly improved because of the balance of the axial chromatic aberration. It is known to those skilled in the art that to obtain such an achromatic effect as is aimed at by the conventional systems, one lens of the second group of lenses must be as achromatic as the so called isolating achromatization, and another lens should be added to the second group of lenses.

But to have the best possible zooming lens for projection and photography, the correction of chromatic aberration should be done by using a zooming lens system of fewer lenses.

According to the present invention, for the above mentioned purposes, the first group of lenses are subjected to special achromatic treatment and the second group of lenses are not subjected to isolating achromatization. The range of deviation of chromatic aberration of magnification at the shortest focal length and the maximum focal length is reduced less than one third by the balance of the dispersion ratio of the glass of the concave lenses of the relay lens system. Thus the present invention successfully provide the best possible correction of the chromatic aberration on a commercial basis.

In the zooming lens whose zooming zone is near to the wide-angle side, it is necessary to remove the distortion, and the form of the negative lenses of the second group should be selected as is described hereinafter.

According to the present invention, it is possible to obtain a zooming system whose distortion is nearly perfectly corrected in spite of the fact that the covering angle of image is as large as 25°.

The focal length of the first group is represented by $f_1$, and the focal length on $d$ line is represented by $f_{1d}$, and the focal length of F line is represented by $f_{1F}$, and the focal length on C line is represented by $f_{1C}$, and the radii of curvature are represented by $r_1$, $r_2$ and $r_3$ from the front.

The focal length of the second group is represented by $f_2$, and the radii of curvature of the two negative lenses are represented by $r_4$, $r_5$, $r_6$, and $r_7$, successively.

The focal length of the relay lens system is represented by $f_R$, and the diverging lens group (composed of one or two adhered lenses) which is contained therein, is represented by $f_a$, and the focal lengths on $d$ line, F line, and C line are respectively $f_{ad}$, $f_{aF}$, and $f_{aC}$, and the following conditions must be satisfied.

(1)  $\quad 7f_R > f_1 > 3f_R$ (2)  $\quad 300 < \left| \dfrac{f_{1d}}{f_{1F} - f_{1C}} \right|$ (3)  $\quad 0 < \dfrac{-f_{ad}}{f_{aF} - f_{aC}} < 30 \therefore f_{ad} < 0$ (4)  $\quad 0.5 f_1 < r_1 < 1.0 f_1$ (5)  $\quad |r_4| > 2.5|f_2| > |r_5|$ (6)  $\quad |r_6| > 2.5|f_2| > |r_7|$ In the condition represented by Formula 1, $f_1 > 3f_R$ shows the restriction on the size of the zooming system for correcting the aberration.

In an ordinary zooming system when the zooming system becomes larger than the relay lens system, the production of the mechanism becomes easier and these aberrations are decreased.

When $f_1$ becomes smaller than $3f_R$, these aberrations are deteriorated, and in particular, the correction of the spherical aberration of curved images becomes difficult only when using 4 or 5 relay lenses. The condition represented by the formula $7f_R > f_1$ controls the form of the zooming system so as not to be enlarged too much.

Formulae 2 and 3 are the conditions required for achromatization, and Formula 2 is a condition for associating the chromatic aberration of magnification at the minimum focal length and the maximum focal length in the minus direction. Formula 3 is a condition for reducing the axial chromatic aberration and for correcting the chromatic abberations associated in the minus direction by the Formula 2 to the plus direction to finely remove the aberrations. Outside of above defined conditions (2) and (3), it is impossible to correct the remaining axial chromatic aberration and chromatic aberration of magnification. To satisfy the condition of Formula 3, glass of remarkably low Abbe's number is required, and sometimes, an adhered concave lens is used to reduce the apparent Abbe's number, and the same effect can be obtained.

Formula 4 is a condition for taking the balance of the curved image at the minimum focal length and the maximum focal length.

The conditions represented by general Formulae 5 and 6 stablize the image throughout the whole view, without giving bad effects to the side of the maximum focal length, and prevent the increase of the distortio aberration in the minus direction at the side of the wide-angle view.

When $|r_4| < |r_5|$ or $|r_6| < |r_7|$ the distortion aberration in the minus direction is remarkably increased and the zooming system is made unpractical.

Thus, when the conditions from Formula 1 to Formula 5 are satisfied, it is possible to obtain a continuous zooming system having remarkably stabilized efficiencies throughout the whole zooming range.

The following are the embodiments of the present invention, and in the following embodiments, $r_1, r_2 \ldots r_{17}$ are the radii of curvature of the respective lenses and $d_1, d_2 \ldots d_{16}$ are the thickness of the center of each lens and air spaces, and $n_1, n_2 \ldots n_9$ are the refractive indices of the respective glasses, and $v_1, v_2 \ldots v_9$ are the Abbe's numbers of the glasses.

[$f=16 \sim 32$, aperture ratio 1:1 (angle of view being 24.33°~12.17°)]

| | | | | |
|---|---|---|---|---|
| Group 1 | $r_1=59.000$ | $d_1=8.0$ | $n_1=1.51823$ | $v_1=59.0$ |
| | $r_2=-48.432$ | $d_2=1.5$ | $n_2=1.78472$ | $v_2=25.7$ |
| | $r_3=-97.500$ | $d_3=2.05\sim25.7$ | | |
| Group 2 | $r_4=-117.455$ | $d_4=1.4$ | $n_3=1.5168$ | $v_3=64.2$ |
| | $r_5=52.767$ | $d_5=1.5$ | | |
| | $r_6=-117.455$ | $d_6=1.4$ | $n_4=1.5168$ | $v_4=64.2$ |
| | $r_7=52.767$ | $d_7=26.95\sim3.3$ | | |
| Group 3 | $r_8=174.6$ | $d_8=2.6$ | $n_5=1.5168$ | $v_5=64.2$ |
| | $r_9=-64.059$ | $d_9=0.5$ | | |
| Group 4 | $r_{10}=17.558$ | $d_{10}=3.4$ | $n_6=1.68893$ | $v_6=31.1$ |
| | $r_{11}=75.25$ | $d_{11}=1.1$ | | |
| | $r_{12}=11.5$ | $d_{12}=5.1$ | $n_7=1.61720$ | $v_7=54.0$ |
| | $r_{13}=\infty$ | $d_{13}=0.191$ | | |
| | $r_{14}=-94.197$ | $d_{14}=3.0$ | $n_8=1.86074$ | $v_8=23.1$ |
| | $r_{15}=7.0$ | $d_{15}=4.5$ | | |
| | $r_{16}=13.669$ | $d_{16}=2.4$ | $n_9=1.65160$ | $v_9=58.5$ |
| | $r_{17}=-19.410$ | | | |

According to the present invention it is possible to perfectly remove the chromatic aberration of magnification without increasing the number of lenses. It is also possible to increase the zooming ratio by the correction of distortion aberration. The zooming lens of miniature type and high efficiency which can increase the zooming ratio by the correction of distortion aberration and at the same time can cover the wide angle side.

What is claimed is:

1. A zoom lens system having four groups of lenses comprising in seriatim from the front to the back of a first converging group, a diverging group, a second converging group and a third converging group, in which the first converging group consists of a set of positive and negative cemented lenses, the diverging group consists of two single negative lenses which are moved in unison for enabling zoom operation, the second converging group consists of a positive lens, and the third converging group is a relay lens system of a positive lens, a second positive lens, a negative lens and a third positive lens, the material of the lenses of the first converging group being chosen so that the focal lengths of the d, F and C lines provide chromatic aberration of magnification in the minus direction at the minimum and maximum focal lengths of the zooming range, while the low dispersive value of the negative lens in the third converging group is selected to balance the chomatic aberration of magnification and correct actual chromatism.

2. A zoom lens system according to claim 1, having a numerical data substantially as set forth in the following table:

[$f=16\sim32$, aperature ratio 1:1.4 (angle of view being 24.33°~12.17°)]

| | | | | |
|---|---|---|---|---|
| Group 1 | $r_1=59.000$ | $d_1=8.0$ | $n_1=1.51823$ | $v_1=59.0$ |
| | $r_2=-48.432$ | $d_2=1.5$ | $n_2=1.78472$ | $v_2=25.7$ |
| | $r_3=-97.500$ | $d_3=2.05\sim25.7$ | | |
| Group 2 | $r_4=-117.455$ | $d_4=1.4$ | $n_3=1.5168$ | $v_3=64.2$ |
| | $r_5=52.767$ | $d_5=1.5$ | | |
| | $r_6=-117.45$ | $d_6=1.4$ | $n_4=1.5168$ | $v_4=64.2$ |
| | $r_7=52.767$ | $d_7=26.95\sim3.3$ | | |
| Group 3 | $r_8=174.6$ | $d_8=2.6$ | $n_5=1.5168$ | $v_5=64.2$ |
| | $r_9=-64.059$ | $d_9=0.5$ | | |
| Group 4 | $r_{10}=17.558$ | $d_{10}=3.4$ | $n_6=1.68893$ | $v_6=31.1$ |
| | $r_{11}=75.25$ | $d_{11}=1.1$ | | |
| | $r_{12}=11.5$ | $d_{12}=5.1$ | $n_7=1.61720$ | $v_7=54.0$ |
| | $r_{13}=\infty$ | $d_{13}=0.191$ | | |
| | $r_{14}=-94.197$ | $d_{14}=3.0$ | $n_8=1.86074$ | $v_8=23.1$ |
| | $r_{15}=7.0$ | $d_{15}=4.5$ | | |
| | $r_{16}=13.669$ | $d_{16}=2.4$ | $n_9=1.65160$ | $v_9=58.5$ |
| | $r_{17}=-19.410$ | | | | wherein $r$ subscript denotes the radius of curvature of respective lenses, $d$ subscript the thickness of the center of each lens and air space, $n$ subscript the refractive index of the respective glass and $v$ subscript the Abbe's number of the glass.

References Cited

UNITED STATES PATENTS

| | | | |
|---|---|---|---|
| 3,270,615 | 9/1966 | Higuchi | 350—184 |
| 3,274,887 | 9/1966 | Macher | 350—184 |
| 3,348,898 | 10/1967 | Baur et al. | 350—184 |

JOHN K. CORBIN, Primary Examiner

U.S. Cl. X.R.

350—214, 223